(12) United States Patent
Yang et al.

(10) Patent No.: US 12,310,336 B2
(45) Date of Patent: May 27, 2025

(54) OUTDOOR FOLDING DINING TABLE FOR PETS

(71) Applicant: KIND PET PRODUCTS CO., LTD, Zhongshan (CN)

(72) Inventors: Tianle Yang, Zhongshan (CN); Yibao Zeng, Zhongshan (CN)

(73) Assignee: KIND PET PRODUCTS CO., LTD, Zhongshan (CN)

( * ) Notice: Subject to any disclaimer, the term of this patent is extended or adjusted under 35 U.S.C. 154(b) by 0 days.

(21) Appl. No.: 18/451,584

(22) Filed: Aug. 17, 2023

(65) Prior Publication Data

US 2024/0251750 A1 Aug. 1, 2024

(30) Foreign Application Priority Data

Feb. 1, 2023 (CN) .......................... 202320143518.5

(51) Int. Cl.
*A01K 5/01* (2006.01)

(52) U.S. Cl.
CPC .................................. *A01K 5/0114* (2013.01)

(58) Field of Classification Search
CPC .... A01K 5/0135; A01K 5/0114; A47C 3/083; A47B 2003/0835; A47B 3/087; A47B 3/10; A47B 23/001
See application file for complete search history.

(56) References Cited

U.S. PATENT DOCUMENTS

| 134,149 | A | * | 12/1872 | King | A47B 3/087 144/285 |
| 137,658 | A | * | 4/1873 | Cornell | A47B 3/087 108/36 |
| 157,232 | A | * | 11/1874 | Simmons | A47B 3/087 108/36 |
| 318,779 | A | * | 5/1885 | Mehaffey | A47B 3/087 108/36 |

(Continued)

FOREIGN PATENT DOCUMENTS

DE 202011106462 U1 * 3/2012 ............. A47B 3/087
EP 2522252 A1 * 11/2012 ............. A47B 3/087

(Continued)

OTHER PUBLICATIONS

Merged translation of DE_202011106462 (Year: 2012).*

(Continued)

*Primary Examiner* — Morgan T Jordan

(57) ABSTRACT

An outdoor folding dining table for pets includes a mounting base, two groups of table platforms, two groups of table legs and two groups of swing rods, wherein the two groups of table platforms are respectively rotatably connected to two upper sides of the mounting base, the two groups of table legs are respectively rotatably connected to two lower sides of the mounting base, and two ends of each group of swing rods are respectively hinged to one group of table platforms and one group of table legs which are located on the same side. During use, the dining table for pets may be normally used only by outwards rotating for unfolding the two groups (Continued)

of table platforms and table legs and propping up and fixing the table platforms and the table legs by utilizing the swing rods, so that the use and operation are very convenient.

7 Claims, 3 Drawing Sheets

(56) References Cited

U.S. PATENT DOCUMENTS

| | | | | |
|---|---|---|---|---|
| 1,181,320 | A * | 5/1916 | Korn | A47B 3/087 108/36 |
| 1,229,645 | A * | 6/1917 | Nesmith et al. | A47B 3/087 248/166 |
| 1,238,338 | A * | 8/1917 | Risdon | A47B 3/087 108/35 |
| 1,792,698 | A * | 2/1931 | Morgan | A47B 3/087 108/3 |
| 2,673,774 | A * | 3/1954 | Di Prima | A47B 3/087 190/11 |
| 3,651,787 | A * | 3/1972 | Cooper | A01K 5/0114 119/61.5 |
| 3,777,674 | A * | 12/1973 | Parsons | A47B 25/003 473/496 |
| 4,010,696 | A * | 3/1977 | Priesman | A47B 23/001 108/19 |
| 4,133,271 | A * | 1/1979 | Carlson | A47B 3/087 108/174 |
| 4,976,223 | A * | 12/1990 | Pierce | A01K 5/0114 248/128 |
| 5,000,124 | A * | 3/1991 | Bergen | A01K 5/0114 248/295.11 |
| 5,009,170 | A * | 4/1991 | Spehar | A47B 3/10 108/132 |
| 5,020,799 | A * | 6/1991 | Chang | A47B 25/00 108/130 |
| 5,054,431 | A * | 10/1991 | Coviello | A01K 5/0114 119/51.01 |
| 5,509,376 | A * | 4/1996 | Tsengas | A01K 5/0135 119/51.5 |
| 5,676,062 | A * | 10/1997 | Lloyd | A61G 13/105 108/132 |
| 5,782,185 | A * | 7/1998 | Frahm | A47B 3/08 100/25 |
| 5,943,965 | A * | 8/1999 | Riach | A47B 3/087 108/131 |
| 6,568,506 | B1 * | 5/2003 | Donnalley | A47C 12/02 182/33 |
| 7,124,709 | B1 * | 10/2006 | Greer | A01K 5/0114 119/61.5 |
| 7,938,083 | B1 * | 5/2011 | Huether | A01K 5/0114 119/61.5 |
| 10,524,451 | B1 * | 1/2020 | Sciortino | A01K 5/0114 |
| 10,918,079 | B1 * | 2/2021 | Mora | F16M 11/38 |
| 2008/0035066 | A1 * | 2/2008 | Enriquez | A01K 5/0114 119/61.5 |
| 2008/0072827 | A1 * | 3/2008 | Bohjalian | A01K 5/0114 119/28.5 |
| 2009/0199775 | A1 * | 8/2009 | Shamoon | A01K 5/0114 119/51.01 |
| 2010/0186638 | A1 * | 7/2010 | Roy | A63H 33/003 108/115 |
| 2014/0261203 | A1 * | 9/2014 | Renforth | A01K 5/0114 119/61.56 |
| 2014/0346293 | A1 * | 11/2014 | Qiu | A01K 5/0114 248/176.1 |
| 2015/0250147 | A1 * | 9/2015 | Briski | A01K 5/0114 248/125.7 |
| 2016/0242385 | A1 * | 8/2016 | Parness | F16M 11/38 |
| 2018/0317448 | A1 * | 11/2018 | Yang | A01K 5/0114 |
| 2019/0045919 | A1 * | 2/2019 | Boyer | A47B 3/002 |
| 2022/0386561 | A1 * | 12/2022 | Yu | A01K 5/0135 |
| 2024/0251750 | A1 * | 8/2024 | Yang | A01K 5/0114 |

FOREIGN PATENT DOCUMENTS

| | | | | |
|---|---|---|---|---|
| FR | 2586574 | A1 * | 3/1987 | |
| WO | WO-2015113350 | A1 * | 8/2015 | A01K 5/0114 |

OTHER PUBLICATIONS

Merged translation of EP_2522252 (Year: 2012).*
Merged translation of FR_2586574 (Year: 1987).*
Merged translation of WO_2015113350 (Year: 2015).*

* cited by examiner

OUTDOOR FOLDING DINING TABLE FOR PETS

TECHNICAL FIELD

The application relates to the technical field of pet supplies, in particular to an outdoor folding dining table for pets.

BACKGROUND

At present, a dining table for pets on the market generally includes a table platform and table legs for supporting the table platform, a table top of the table platform is provided with an installation position for placing a pet bowl, and during use, a user places pet food into the pet bowl, so that a pet may have a self-service meal. However, the existing dining tables for pets are generally relatively large in size, and the table legs and the table platform are of an integrated structure, so that the tables are inconvenient to store and move. In daily life, such dining tables for pets occupy a large space. During an outing with a pet, such dining tables for pets are inconvenient to carry. In addition, during packaging for transportation, the packaging size of such dining tables for pets is large, so that the carrying is inconvenient, and the transportation cost is additionally increased.

SUMMARY

In order to overcome the defects of the relevant art, an objective of the application is to provide an outdoor folding dining table for pets, which is convenient to store and carry, and reduces the occupied space and transportation cost.

In order to solve the above problems, the application adopts the following technical solution: an outdoor folding dining table for pets includes a mounting base, two groups of table platforms, two groups of table legs and two groups of swing rods, the two groups of table platforms are respectively rotatably connected to two upper sides of the mounting base, the two groups of table legs are respectively rotatably connected to two lower sides of the mounting base, and two ends of each group of swing rods are respectively hinged to one group of table platforms and one group of table legs which are located on the same side.

Compared with the relevant art, the application has the beneficial effects that: when unused, carrying or packaging for transportation, the two groups of table platforms and the two groups of table legs of the dining table for pets may be rotated to be closed and folded together relative to the mounting base, the swing rods are also folded between the table platforms and the table legs, so that the occupation space of the dining table for pets may be reduced, and meanwhile, the carrying and transportation are also convenient. During use, the dining table for pets may be normally used only by outwards rotating for unfolding the two groups of table platforms and table legs and propping up and fixing the table platforms and the table legs by utilizing the swing rods, so that the use and operation are very convenient.

For the outdoor folding dining table for pets, the table platform is provided with a mounting groove for mounting a pet bowl, and the pet bowl is detachably connected or integrally formed into the mounting groove.

For the outdoor folding dining table for pets, the angles are equal when the two groups of table legs are rotated to be unfolded.

For the outdoor folding dining table for pets, the two groups of table legs are rotatably connected with the mounting base through two groups of rotating shafts respectively, gears are mounted at the end parts of the two groups of rotating shafts, and the two groups of gears are connected in a meshing manner.

For the outdoor folding dining table for pets, the end part of the mounting base is provided with end covers, and the end covers are fixedly connected with the mounting base and located on the outer sides of the gears.

For the outdoor folding dining table for pets, during folding, the two groups of the table platforms attach to each other, the two groups of table legs attach to each other, and the two groups of the table legs are respectively accommodated in the two groups of table platforms.

For the outdoor folding dining table for pets, a first yielding groove is formed in the side, close to the mounting base, of the table platform, and during folding, the first yielding groove is connected with the mounting base in an embedding manner.

For the outdoor folding dining table for pets, a second yielding groove is formed in the side, away from the mounting base, of the table platform, during folding, the end, close to the mounting base, of the table leg is accommodated in the table platform, and the other end stretches out from the second yielding groove.

For the outdoor folding dining table for pets, the table legs are U-shaped.

For the outdoor folding dining table for pets, the end, away from the mounting base, of the table leg is provided with a non-slip pad.

The application will be further described in detail below with reference to the drawings and specific implementation modes.

Reference signals of the drawings: 100. Mounting base, 110. End cover, 200. Table platform, 210. First yielding groove, 220. Second yielding groove, 230. Mounting groove, 300. Table leg, 400. Swing rod, 500. Pet bowl, 600. Gear, 700. Rotating shaft, and 800. Non-slip pad.

DETAILED DESCRIPTION OF THE EMBODIMENTS

Figure 1:
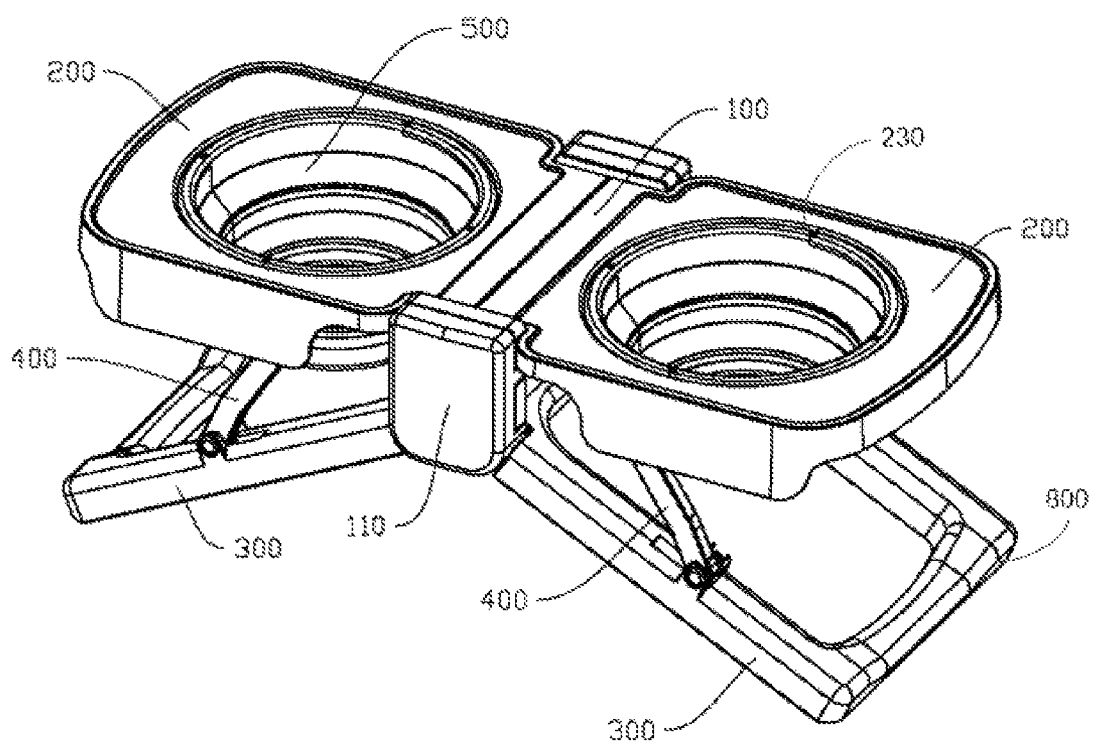
FIG. 1 is a schematic diagram of an overall structure when a dining table for pets is unfolded according to an embodiment of the application.
Figure 2:
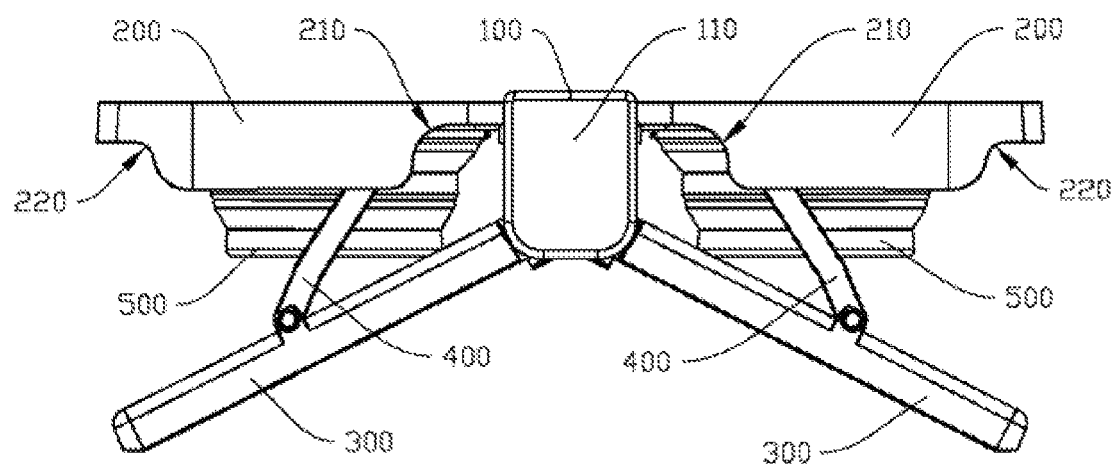
FIG. 2 is a schematic diagram of a front view of a dining table for pets as shown in FIG. 1.
Figure 3:
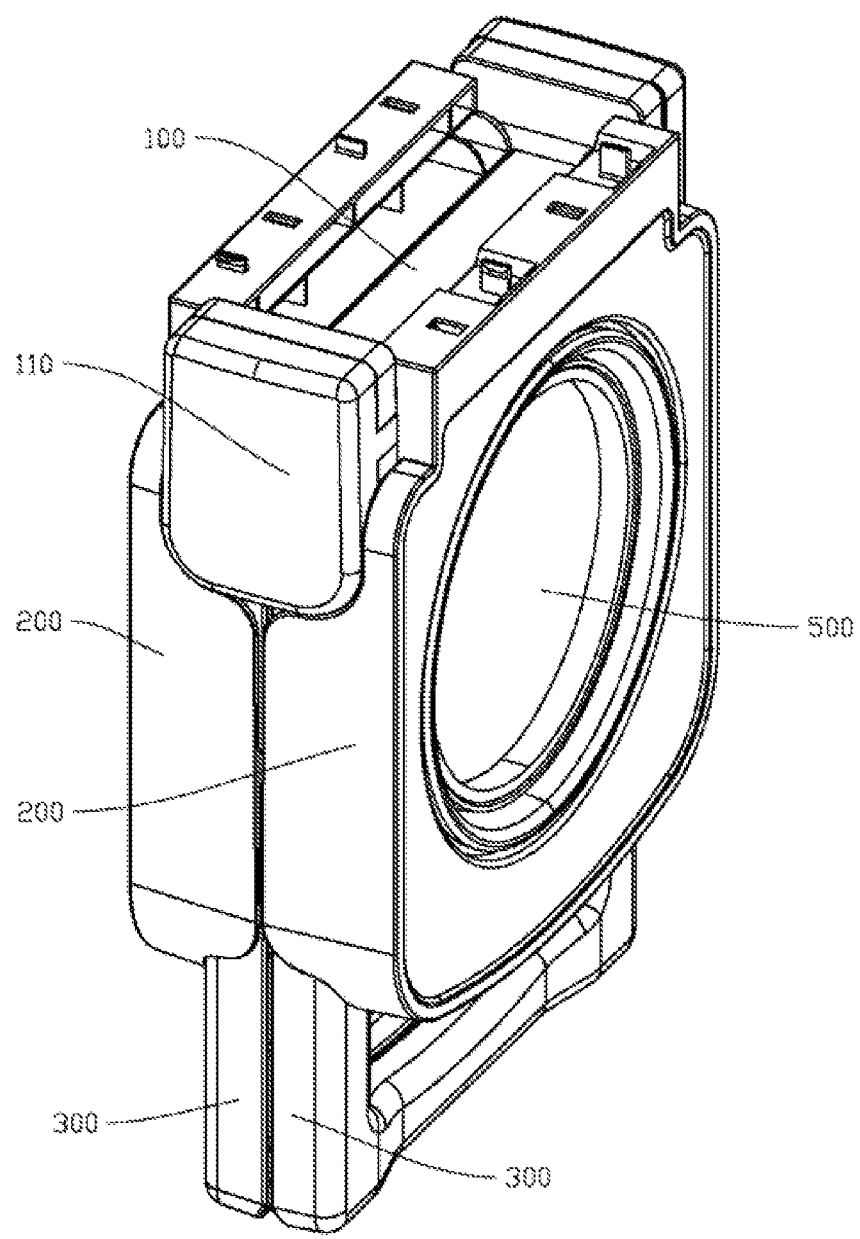
FIG. 3 is a schematic diagram of an overall structure when a dining table for pets is unfolded according to an embodiment of the application.

The embodiment of the application will be described in detail below, referring to FIGS. 1 and 2, the embodiment of the application provides an outdoor folding dining table for pets, which includes a mounting base 100, two groups of table platforms 200, two groups of table legs 300 and two groups of swing rods 400, the two groups of table platforms 200 are respectively rotatably connected to two upper sides of the mounting base 100, the two groups of table legs 300 are respectively rotatably connected to two lower sides of the mounting base 100, and two ends of each group of swing rods 400 are respectively hinged to one group of table platforms 200 and one group of table legs 300 which are located on the same side. Referring to FIG. 3, when unused, carrying or packaging for transportation, the two groups of table platforms 200 and the two groups of table legs 300 of the dining table for pets may be rotated to be closed and folded together relative to the mounting base 100, the swing rods 400 are also folded between the table platforms 200 and the table legs 300, so that the occupation space of the dining table for pets may be reduced, and meanwhile, the carrying and transportation are also convenient. Referring to FIGS. 1 and 2, during use, the dining table for pets may be normally used only by outwards rotating for unfolding the two groups of table platforms 200 and table legs 300 and propping up and fixing the table platforms 200 and the table legs 300 by utilizing the swing rods 400, so that the use and operation are very convenient.

Specifically, the table platform 200 is provided with a mounting groove 230 for mounting a pet bowl 500, the pet bowl 500 may be detachably mounted in the mounting groove 230 or integrally formed with the mounting groove 230, which may be set according to actual needs specifically. Specifically, for rotating connection between the table platform 200 and the mounting base 100, rotating connection between the table leg 300 and the mounting base 100, and hinging of the swing rod 400 with the table platform 200 and the table leg 300, elastic hinging may be adopted, that is, an elastic material is adopted to realize connection at rotating connection positions. Taking the hinging of the swing rod 400 with the table platform 200 and the table leg 300 as an example, when an external force is applied, the rotating connection positions may have a slight elastic deformation, so that two ends of the swing rod 400 may be rotated relative to the table platform 200 and the table leg 300, the table platform 200 and the table leg 300 may be unfolded normally, when the external force is canceled, the elastic deformation of the rotating connection positions restores, two ends of the swing rod 400 are fixed relative to the table platform 200 and the table leg 300 and may prop up the table platform 200 and the table leg 300, so that the dining table for pets is in an unfolded state.

Figure 4:
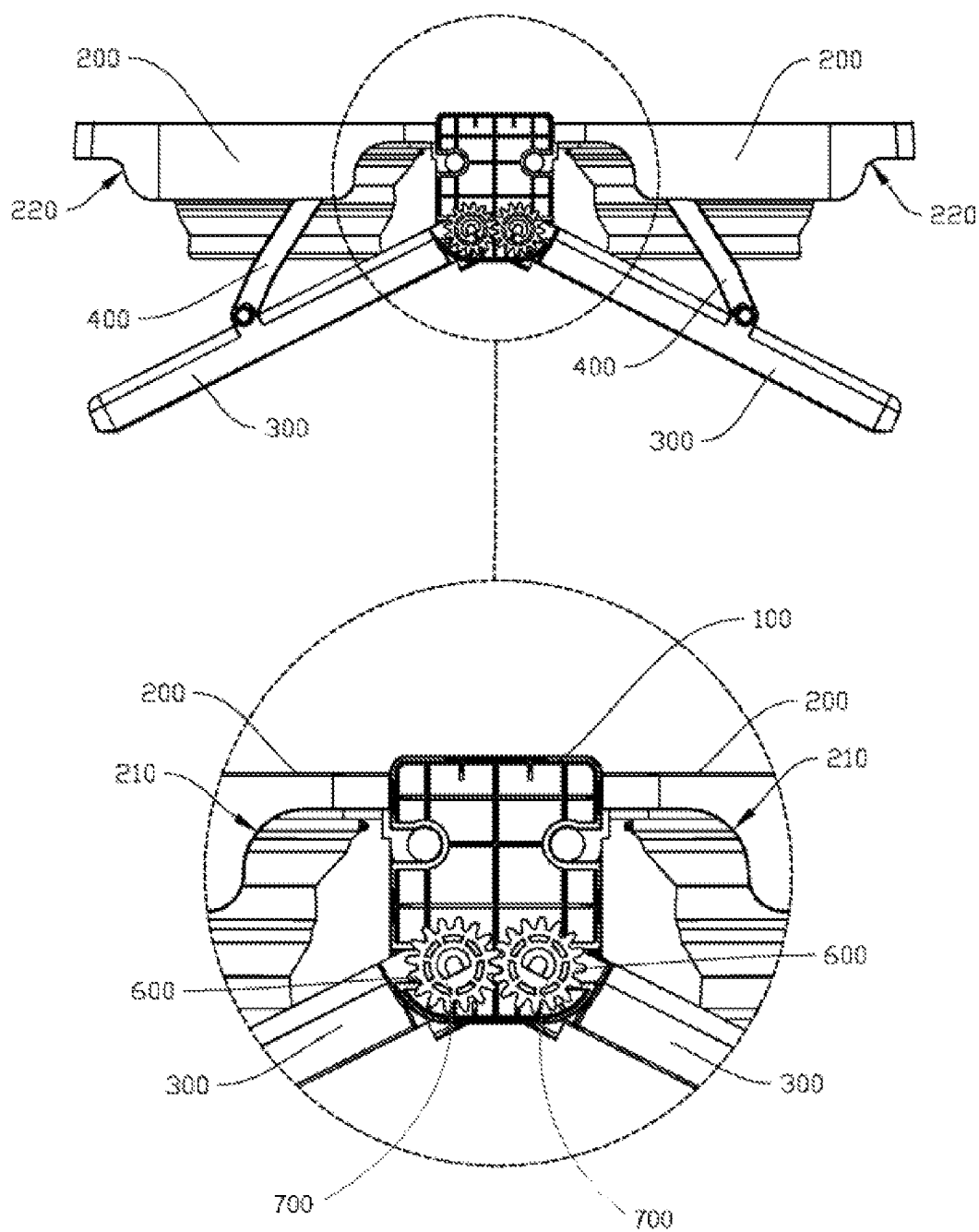
FIG. 4 is a schematic diagram of a partial structure when a dining table for pets is unfolded according to an embodiment of the application (end covers concealed).

Furthermore, the angles are equal when the two groups of table legs 300 are rotated to be unfolded, so that the dining table for pets may be stably placed. Specifically, referring to FIG. 4, that the angles are equal when the two groups of table legs 300 are rotated to be unfolded may be realized through the following way: the two groups of table legs 300 are rotatably connected with the mounting base 100 through two groups of rotating shafts 700 respectively, gears 600 are mounted at the end parts of the two groups of rotating shafts 700, and the two groups of gears 600 are connected in a meshing manner. When one group of table legs 300 is rotated outwards, the group of table legs 300 rotates relative to the mounting base 100, driven by the two groups of gears 600, the other group of table legs 300 is bound to rotate in the opposite direction, and the rotation angles of the two groups of table legs 300 are equal all the time. Of course, it is also possible to set a clamping position at the rotating connecting position, when both the two groups of table legs 300 are rotated to the clamping position, the unfolding angles are naturally equal, but this structure cannot make the table leg 300 to be unfolded to a variety of angles. While with the adoption of a linkage mode of the two groups of gears 600, under the premise that the unfolding angles of the two groups of table legs 300 are equal, the table leg 300 may be unfolded to a variety of angles. Furthermore, the end part of the mounting base 100 is provided with end covers 110, and the end covers 110 are fixedly connected with the mounting base 100 and located on the outer sides of the gears 600.

Furthermore, during folding, the two groups of the table platforms 200 attach to each other, the two groups of table legs 300 attach to each other, the two groups of the table legs 300 are respectively accommodated in the two groups of table platforms 200, so that the occupation space of the dining table for pets may be further reduced, in such a case, the table legs 300 may be set shorter, and the table legs 300 may be fully accommodated in the table platform 200, which may be used for small pets. Furthermore, a first yielding groove 210 is formed in the side, close to the mounting base 100, of the table platform 200, and during folding, the first yielding groove 210 is connected with the mounting base 100 in an embedding manner, so that interference between the table platform 200 during folding and the mounting base 100 may be avoided. Still furthermore, for large pets, the table legs 300 need to be set longer, in order to avoid interference between the table platform 200 during folding and the table legs 300, a second yielding groove 220 is formed in the side, away from the mounting base 100, of the table platform 200, during folding, the end, close to the mounting base 100, of the table leg 300 is accommodated in the table platform 200, and the other end stretches out from the second yielding groove 220. As shown in FIG. 3, when the dining table for pets is folded, the whole is in a block shape, so that the carrying, packaging and transportation are convenient.

Furthermore, in some embodiments, each group of table legs 300 may include two support rods, namely, one dining table for pets includes four support rods. In some other embodiments, the table legs 300 are U-shaped, the open side is rotatably connected to the mounting base 100, and the closed side is configured for supporting. When the dining table for pets is folded, the closed side of the table leg 300 may be held by hand, which is convenient for carrying and moving. Furthermore, the end, away from the mounting base 100, of the table leg 300 is provided with a non-slip pad 800.

It is to be noted that in the description of the application, orientation or position relationships indicated by terms "upper", "lower", "front", "rear", "left", "right" and the like are orientation or position relationships shown in the drawings, are adopted not to indicate or imply that indicated apparatuses or components must be in specific orientations or structured and operated in specific orientations but only to conveniently and simply describe the present application and thus should not be understood as limits to the present application.

In the descriptions of the application, "a plurality of" means one or more, "multiple" means two or more, greater than, less than, more than and the like are understood to exclude this number, and above, below, within and the like are understood to include this number. Terms "first" and "second" are only adopted for distinguishing technical features and should not be understood to indicate or imply relative importance or implicitly indicate the number of indicated technical features or implicitly indicate the sequence of the indicated technical features.

In the description of the application, unless otherwise limited definitely, the terms "dispose" "mount" and "connect" should be broadly understood, for those skilled in the art, specific meanings of these terms in the application can be reasonably determined according to a specific content of the technical solution.

The implementation modes described above are only preferred implementation modes of the application and are not intended to limit the scope of protection of the application, and any insubstantial changes and substitutions made by those skilled in the art on the basis of the application shall fall within the scope of protection of the application.

The invention claimed is:

1. An outdoor folding dining table for pets, comprising:
   a mounting base (100), two table platforms (200), two table legs (300) and two pairs of swing rods (400),
   wherein the two table platforms (200) are respectively rotatably connected to two upper sides of the mounting base (100);
   wherein the two table legs (300) are respectively rotatably connected to two lower sides of the mounting base (100); and
   wherein two ends of each pair of swing rods (400) are respectively hinged to one of the two table platforms (200) and one of the two table legs (300) which are located on the same side;
   wherein the two table legs (300) are rotatably connected with the mounting base (100) through two or more rotating shafts (700) respectively, gears (600) are mounted at the end parts of the two or more rotating shafts (700), and the two or more gears (600) are connected in a head to head meshing manner;
   wherein during folding, the two table platforms (200) attach to each other, the two table legs (300) attach to each other, and the two table legs (300) are respectively accommodated in the two table platforms (200);
   wherein a second yielding groove (220) is formed in the side away from the mounting base (100) of the table platform (200), during folding, the end close to the mounting base (100) of the table leg (300) is accommodated in the table platform (200), and the other end stretches out from the second yielding groove (220).

2. The outdoor folding dining table for pets as claimed in claim 1, wherein each table platform (200) is provided with a mounting groove (230) for mounting a pet bowl (500), and the pet bowl (500) is detachably connected or integrally formed into the mounting groove (230).

3. The outdoor folding dining table for pets as claimed in claim 1, wherein angles are equal when the two table legs (300) are rotated to be unfolded.

4. The outdoor folding dining table for pets as claimed in claim 1, wherein an end part of the mounting base (100) is provided with end covers (110), and the end covers (110) are fixedly connected with the mounting base (100) and located on the outer sides of the gears (600).

5. The outdoor folding dining table for pets as claimed in claim 1, wherein a first yielding groove (210) is formed in the side close to the mounting base (100) of the table platform (200), and during folding, the first yielding groove (210) is connected with the mounting base (100) in an embedding manner.

6. The outdoor folding dining table for pets as claimed in claim 1, wherein each table leg (300) is U-shaped.

7. The outdoor folding dining table for pets as claimed in claim 1, wherein the end away from the mounting base (100) of the table leg (300) is provided with a non-slip pad (800).

* * * * *